United States Patent
Phan

(10) Patent No.: US 6,677,686 B1
(45) Date of Patent: Jan. 13, 2004

(54) REDUNDANT POWER SUPPLY SYSTEM WITH IMPROVED REFERENCE VOLTAGE SAMPLING AT LOW LOADS

(75) Inventor: Trungnhan (Tony) Phan, Moorpark, CA (US)

(73) Assignee: Allied Telesyn International Corp., Bothell, WA (US)

(*) Notice: Subject to any disclaimer, the term of this patent is extended or adjusted under 35 U.S.C. 154(b) by 34 days.

(21) Appl. No.: 09/996,472

(22) Filed: Nov. 27, 2001

(51) Int. Cl.[7] .................................................. H02J 1/08
(52) U.S. Cl. ............................................ 307/12; 307/43
(58) Field of Search ............................. 307/12, 43, 60; 327/91

(56) References Cited

U.S. PATENT DOCUMENTS

| | | | | |
|---|---|---|---|---|
| 4,136,286 A | * | 1/1979 | O'Halloran et al. | 307/57 |
| 4,533,836 A | * | 8/1985 | Carpenter et al. | 307/11 |
| 4,644,440 A | * | 2/1987 | Kenny et al. | 361/111 |
| 5,686,814 A | * | 11/1997 | Wierzbicki | 307/51 |

* cited by examiner

Primary Examiner—Gregory J. Toatley, Jr.
Assistant Examiner—Sharon A. Polk
(74) Attorney, Agent, or Firm—Cooley Godward LLP

(57) ABSTRACT

An electronic system includes a common power bus and a variable load connected to the common power bus. A first power supply output node and a first sense line node of a first power supply are connected to the common power bus. A second power supply output node and a second sense line node of a second power supply are connected to the common power bus. A sense line load adjustment circuit is linked to the common power bus, the first sense line node, and the second sense line node. The sense line load adjustment circuit is configured to generate a mirror voltage that provides a corrected reference voltage at the first sense line node and the second sense line node in the presence of a relatively small variable load.

21 Claims, 2 Drawing Sheets

REDUNDANT POWER SUPPLY SYSTEM WITH IMPROVED REFERENCE VOLTAGE SAMPLING AT LOW LOADS

BRIEF DESCRIPTION OF THE INVENTION

This invention relates generally to power supplies used in electronic systems. More particularly, this invention relates to a redundant power supply system with improved reference voltage sampling during low loads.

BACKGROUND OF THE INVENTION

FIG. 1 illustrates an electronic system 20 with redundant power supplies. The system 20 includes a first power supply 22 and a second power supply 24 connected to a common power bus 25 that supplies power to a variable load 26. By way of example, the electronic system 20 may be a motherboard with a set of slots that form the variable load 26.

The first power supply 22 has a first power supply output node 28 connected to the common power bus 25 via a first power line 30. A first power line diode 32 is positioned on the first power line 30. The first power line diode 32 operates as an isolating diode so that the first power supply does not fight the second power supply 24.

The first power supply 22 also has a first sense line node 36 connected to the common power bus 25 via a first sense line 38. The first sense line 38 includes a first sense line diode 40 to create an isolated sense line.

The second power supply 24 has an identical configuration, including a second power supply output node 50 connected to the common power bus 25 via a second power line 52. A second power line diode 54 is positioned on the second power line 52. In addition, the second power supply 24 has a second sense line node 56 connected to the common power bus 25 via a second sense line 58. A second sense line diode 60 is connected to the second sense line 58.

The problems associated with the prior art electronic system 20 will be discussed in connection with the first power supply 22 with the understanding that the second power supply 22 has the same problems. When the first power supply 22 generates an output voltage at the first power supply output node 28, the output voltage experience a small voltage drop as a result of the first power line diode 32. The first sense line 38 has a high impedance. Therefore, at low loads the first sense line 38 does not draw any current. As a result, the first sense line diode 40 does not operate in its linear region, meaning that it does not measure small variations in voltage at low loads. This results in inaccurate output voltages from the first power supply 22. In addition, the output voltages are unstable since they are not accurately responding to the actual conditions within the electronic system 20. In order to measure small voltage variations at low loads, it is necessary to have the first sense line diode 40 operate in its linear region so that the sense node 36 of the power supply 22 can measure small voltage variations.

In view of the foregoing, it would be highly desirable to provide improved reference voltage sampling in electronic systems with redundant power supplies serving a small load. Improved reference voltage sampling would facilitate stabile and accurate output voltages at low loads.

SUMMARY OF THE INVENTION

An embodiment of the invention includes an electronic system with a common power bus and a load connected to the common power bus. A first power supply output node and a first sense line node of a first power supply are connected to the common power bus. A second power supply output node and a second sense line node of a second power supply are connected to the common power bus. A sense line load adjustment circuit is linked to the common power bus, the first sense line node, and the second sense line node. The sense line load adjustment circuit is configured to generate a mirror voltage that provides a corrected reference voltage at the first sense line node and the second sense line node in the presence of a relatively small load.

Another embodiment of the invention includes an electronic system with a common power bus and a load connected to the common power bus. A first power supply has a first power supply output node and a first sense line node. A first power line is connected between the first power supply output node and the common power bus. A first power line diode is positioned on the first power line. A first sense line is connected between the first sense line node and the common power bus. A first sense line diode is positioned on the first sense line. A second power supply has a second power supply output node and a second sense line node. A second power line is connected between the second power supply output node and the common power bus. A second power line diode is positioned on the second power line. A second sense line is connected between the second sense line node and the common power bus. A second sense line diode is positioned on the second sense line. A sense line load adjustment circuit is connected to the first sense line and the second sense line. The sense line load adjustment circuit generates a control current to place the first sense line diode and the second sense line diode in a linear region of operation in the presence of a relatively small load.

The invention provides improved reference voltage sampling in electronic systems with redundant power supplies serving low loads. Improved reference voltage sampling stabilizes the output voltages generated by the redundant power supplies. Thus, the redundant power supplies provide more accurate output voltages to isolated sense lines, particularly at low loads. Advantageously, the invention can be implemented using low cost components and simple manufacturing techniques.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
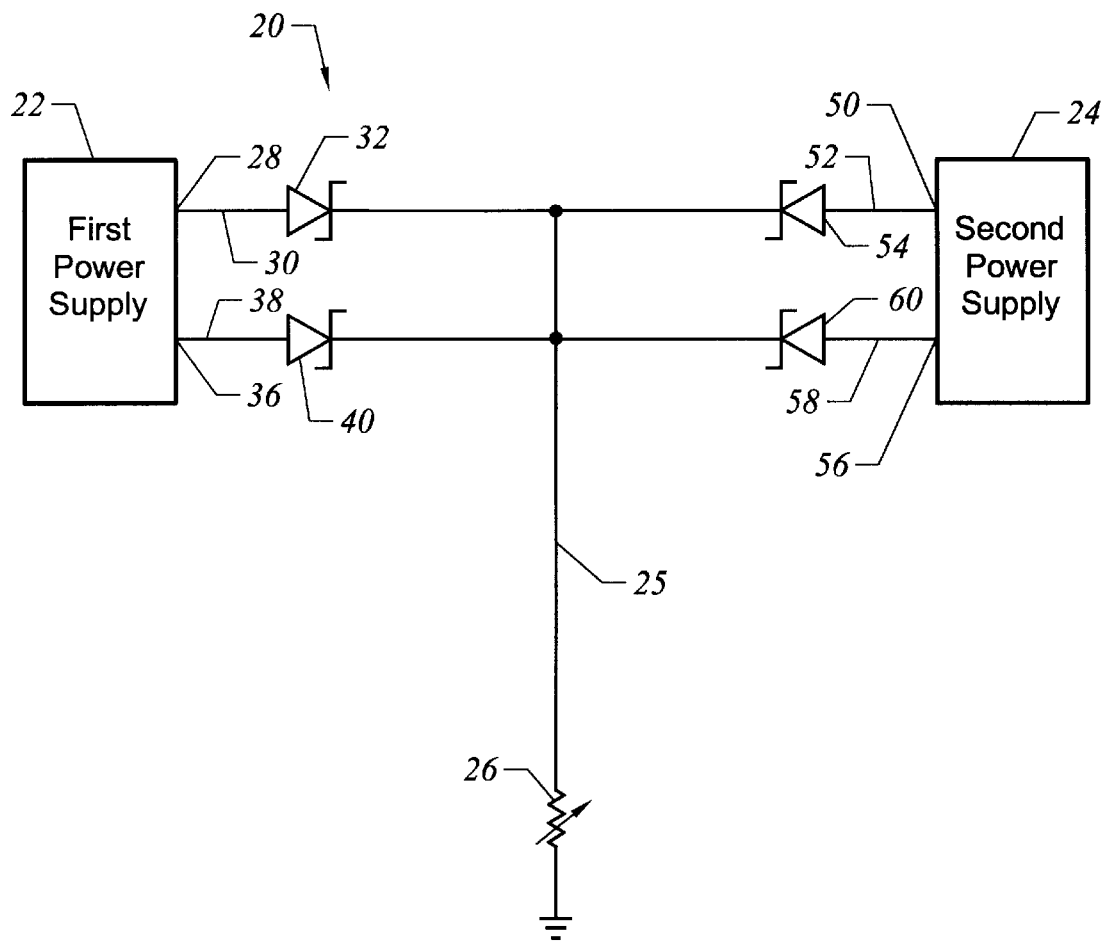
FIG. 1 illustrates an electronic system with a redundant power supply configured in accordance with the prior art.
Figure 2:
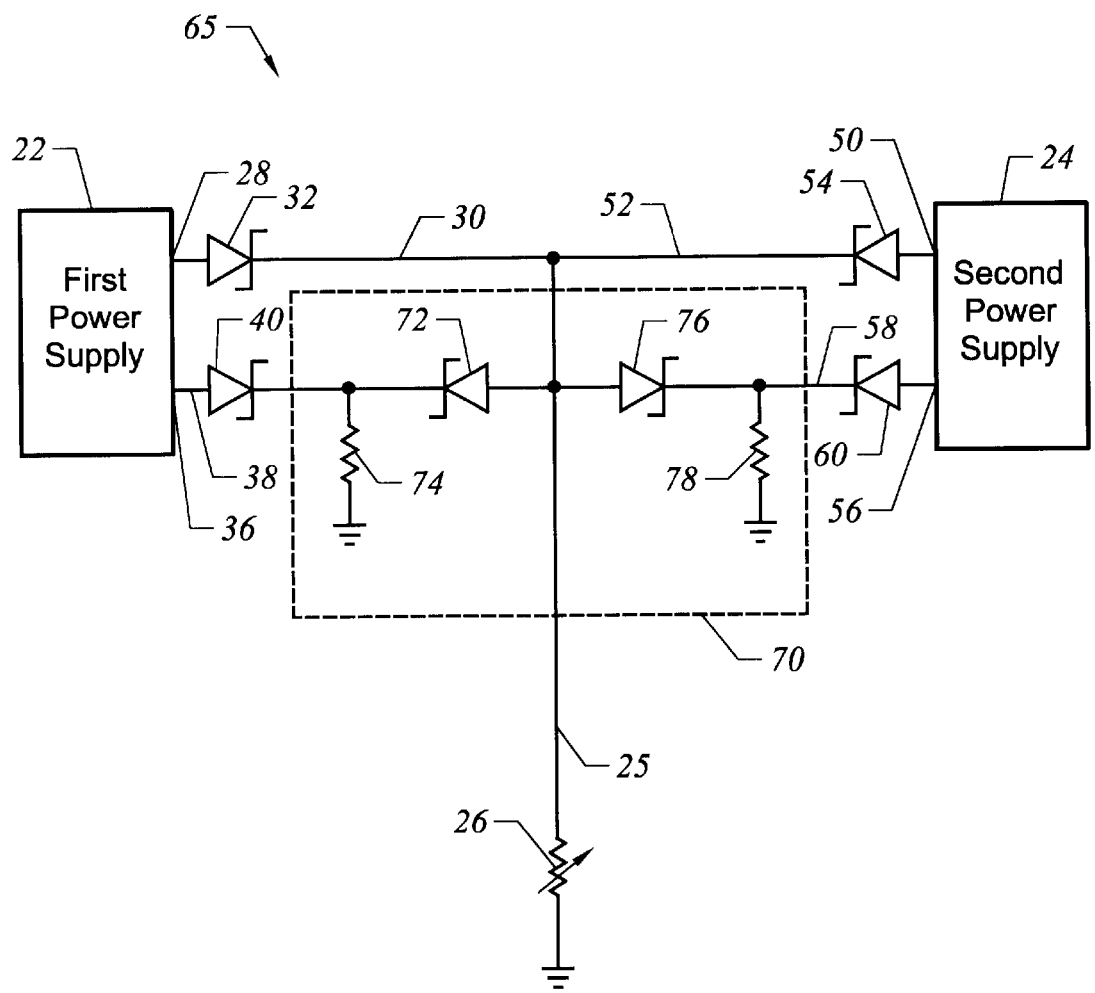
FIG. 2 illustrates an electronic system with a redundant power supply and sense line load adjustment circuit configured in accordance with an embodiment of the invention.

FIG. 2 illustrates an electronic system 65 configured in accordance with an embodiment of the invention. The electronic system 65 includes redundant power supplies 22 and 24 and otherwise corresponds to the system of FIG. 1 with the exception that it includes a sense line load adjustment circuit 70 configured in accordance with an embodiment of the invention.

The sense line load adjustment circuit 70 includes a voltage drop element 72 (e.g., a diode) and a resistive element 74 (e.g., a resistor) connected between the common power bus 25 and the first sense line diode 40. The sense line adjustment circuit 70 also includes a second voltage drop element 76 and a second resistive element 78 connected between the common power bus 25 and the second sense line diode 60.

The sense line load adjustment circuit 70 produces a mirror voltage that provides a corrected reference voltage at the sense line nodes 36 and 56. In particular, the voltage drop element 72 and the resistive element 74 create a control current that allows the sense line diode 40 to operate in its linear range where it can identify small voltage variations in the presence of a relatively small load. A relatively small load in this context is a load that does not generate a sufficient current on the high impedance sense line to allow the sense node to accurately measure voltage conditions within the electronic system.

Similarly, the voltage drop element 76 and the resistive element 78 create a control current that allows the sense line diode 60 to operate in its linear range. Accordingly, each sense line node 36 and 56 processes a more accurate reference voltage at relatively small loads.

The diodes in the system are sized so that the Vcc value at the sense line node is substantially matched to the Vcc value at the supply output node. For example, the diodes are sized so that the cumulative voltage drop produced by the first power line diode 32 and the voltage drop element 72 corresponds to the voltage drop produced by the first sense line diode 40. Similarly, the remaining diodes are sized so that the cumulative voltage drop produced by the second power line diode 54 and the voltage drop element 76 corresponds to the voltage drop produced by the second sense line diode 60.

The sense line load adjustment circuit 70 provides improved reference voltage sampling in electronic systems with redundant power supplies serving low loads. Improved reference voltage sampling stabilizes the output voltages generated by the redundant power supplies 22 and 24. Thus, the redundant power supplies provide more accurate output voltages to the isolated sense lines 38 and 58, particularly at low loads.

Advantageously, inexpensive voltage drop and resistive elements are used to implement the invention. An additional advantage of the sense line load adjustment circuit 70 of the invention is that its components may be easily incorporated into pre-existing electronic systems at a low manufacturing cost.

The foregoing description, for purposes of explanation, used specific nomenclature to provide a through understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, the thereby enable other skilled in the art to best utilize the invention and various embodiments with various modifications as are suited to the particular use contemplated. It is intended that the following claims and their equivalents define the scope of the invention.

What is claimed is:

1. An electronic system, comprising:
    a common power bus;
    a load connected to said common power bus;
    a first power supply with a first power supply output node and a first sense line node connected to said common power bus;
    a second power supply with a second power supply output node and a second sense line node connected to said common power bus; and
    a sense line load adjustment circuit linked to said common power bus, said first sense line node, and said second sense line node, said sense line load adjustment circuit being configured to generate a mirror voltage that provides a corrected reference voltage at said first sense line node and said second sense line node in the presence of a relatively small load.

2. The electronic system of claim 1 further comprising a first power line connecting said first power supply output node with said common power bus.

3. The electronic system of claim 1 further comprising a first sense line connecting said second power supply output node with said common power bus.

4. The electronic system of claim 1 further comprising a second power line connecting said second power supply output node with said common power bus.

5. The electronic system of claim 1 further comprising a second sense line connecting said second sense line node with said common power bus.

6. An electronic system, comprising:
    a common power bus;
    a load connected to said common power bus;
    a first power supply with a first power supply output node and a first sense line node connected to said common power bus;
    a second power supply with a second power supply output node and a second sense line node connected to said common power bus;
    a first power line connecting said first power supply output node with said common power bus;
    a first power line diode positioned on said first power line; and
    a sense line load adjustment circuit linked to said common power bus, said first sense line node, and said second sense line node, said sense line load adjustment circuit being configured to generate a mirror voltage that provides a corrected reference voltage at said first sense line node and said second sense line node in the presence of a relatively small load.

7. An electronic system, comprising:
    a common power bus;
    a load connected to said common power bus;
    a first power supply with a first power supply output node and a first sense line node connected to said common power bus;
    a second power supply with a second power supply output node and a second sense line node connected to said common power bus,
    a first sense line connecting said second power supply output node with said common power bus;
    a first sense line diode positioned on said first sense line, and
    a sense line load adjustment circuit linked to said common power bus, said first sense line node, and said second sense line node, said sense line load adjustment circuit being configured to generate a mirror voltage that provides a corrected reference voltage at said first sense line node and said second sense line node in the presence of a relatively small load.

8. An electronic system, comprising:
a common power bus;
a load connected to said common power bus;
a first power supply with a first power supply output node and a first sense line node connected to said common power bus;
a second power supply with a second power supply output node and a second sense line node connected to said common power bus;
a second power line connecting said second power supply output node with said common power bus;
a second power line diode positioned on said second power line; and
a sense line load adjustment circuit linked to said common power bus, said first sense line node, and said second sense line node, said sense line load adjustment circuit being configured to generate a mirror voltage that provides a corrected reference voltage at said first sense line node and said second sense line node in the presence of a relatively small load.

9. An electronic system, comprising:
a common power bus;
a load connected to said common power bus;
a first power supply with a first power supply output node and a first sense line node connected to said common power bus;
a second power supply with a second power supply output node and a second sense line node connected to said common power bus;
a second sense line connecting said second sense line node with said common power bus;
a second sense line diode positioned on said second sense line;
a sense line load adjustment circuit linked to said common power bus, said first sense line node, and said second sense line node, said sense line load adjustment circuit being configured to generate a mirror voltage that provides a corrected reference voltage at said first sense line node and said second sense line node in the presence of a relatively small load.

10. An electronic system, comprising:
a common power bus;
a load connected to said common power bus;
a first power supply with a first power supply output node and a first sense line node connected to said common power bus;
a second power supply with a second power supply output node and a second sense line node connected to said common power bus; and
a sense line load adjustment circuit linked to said common power bus, said first sense line node, and said second sense line node, said sense line load adjustment circuit being configured to generate a mirror voltage that provides a corrected reference voltage at said first sense line node and said second sense line node in the presence of a relatively small load;
wherein said sense line load adjustment circuit includes:
a first voltage drop element and a first resistive element connected between said first sense line node and said common power bus; and
a second resistive element connected between said second sense line node and said common power bus.

11. The electronic system of claim 10 wherein said first voltage drop element is a first load adjustment diode and said second voltage drop element is a second load adjustment diode.

12. The electronic system of claim 10 wherein said first resistive element is a first resistor and said second resistive element is a second resistor.

13. An electronic system, comprising:
a common power bus;
a load connected to said common power bus;
a first power supply with a first power supply output node and a first sense line node;
a first power line connected between said first power supply output node and said common power bus;
a first power line diode positioned on said first power line;
a first sense line connected between said first sense line node and said common power bus;
a first sense line diode positioned on said first sense line;
a second power supply with a second power supply output node and a second sense line node;
a second power line connected between said second power supply output node and said common power bus;
a second power line diode positioned on said second power line;
a second sense line connected between said second sense line node and said common power bus;
a second sense line diode positioned on said second sense line; and
a sense line load adjustment circuit connected to said first sense line and said second sense line, said sense line load adjustment circuit generating a control current to place said first sense line diode and said second sense line diode in a linear region of operation in the presence of a relatively small load.

14. An electronic system, comprising:
a common power bus;
a load connected to said common power bus;
a first power supply with a first power supply output node and a first sense line node;
a first power line connected between said first power supply output node and said common power bus;
a first power line diode positioned on said first power line;
a first sense line connected between said first sense line node and said common power bus;
a first sense line diode positioned on said first sense line;
a second power supply with a second power supply output node and a second sense line node;
a second power line connected between said second power supply output node and said common power bus;
a second power line diode positioned on said second power line;
a second sense line connected between said second sense line node and said common power bus;
a second sense line diode positioned on said second sense line; and
a sense line load adjustment circuit connected to said first sense line and said second sense line, said sense line load adjustment circuit generating a control current to place said first sense line diode and said second sense line diode in a linear region of operation in the presence of a relatively small load;

wherein said sense line load adjustment circuit includes a voltage drop element and a resistive element connected between first sense line diode and said common power bus.

15. The electronic system of claim 14 wherein said voltage drop element is a load adjustment diode and said resistive element is a resistor.

16. The electronic system of claim 15 wherein the cumulative voltage drop produced by said first power line diode and said load adjustment diode corresponds to the voltage drop produced by said first sense line diode.

17. An electronic system, comprising:

a common power bus;

a load connected to said common power bus;

a first power supply with a first power supply output node and a first sense line node;

a first power line connected between said first power supply output node and said common power bus;

a first power line diode positioned on said first power line;

a first sense line connected between said first sense line node and said common power bus;

a first sense line diode positioned on said first sense line;

a second power supply with a second power supply output node and a second sense line node;

a second power line connected between said second power supply output node and said common power bus;

a second power line diode positioned on said second power line;

a second sense line connected between said second sense line node and said common power bus;

a second sense line diode positioned on said second sense line; and a sense line load adjustment circuit connected to said first sense line and said second sense line, said sense line load adjustment circuit generating a control current to place said first sense line diode and said second sense line diode in a linear region of operation in the presence of a relatively small load;

wherein said sense line load adjustment circuit includes a voltage drop element and a resistive element connected between said second sense line diode and said common power bus.

18. The electronic system of claim 17 wherein said voltage drop element is a load adjustment diode and said resistive element is a resistor.

19. The electronic system of claim 18 wherein the cumulative voltage drop produced by said second power line diode and said load adjustment diode corresponds to the voltage drop produced by said second sense line diode.

20. An electronic system with redundant power supplies, comprising:

a common power bus for providing power to a variable load;

a first power supply having a first power supply output node and a first sense line node for regulating said first power supply;

a second power supply having a second power supply output node and a second sense line node for regulating said second power supply;

said first power supply output node electrically coupled to said common bus by a first power diode;

said second power supply output node electrically coupled to said common bus by a second power diode;

a first sense line diode electrically coupling said first sense line node to a first sense line;

a second sense diode electrically coupling said second sense line node to a second sense line; and a sense line adjustment circuit electrically coupling said first sense line and said second sense line to said common bus, said sense line load adjustment circuit being configured to generate a mirror voltage that provides a corrected reference voltage at said first sense line node and said second sense line node when said variable load is a relatively small load;

whereby measurements of reference voltages used to regulate said first power supply and said second power supply are improved when said variable load is small.

21. An electronic system with redundant power supplies, comprising:

a common power bus for providing power to a variable load;

a first power supply having a first power supply output node and a first sense line node for receiving a first reference voltage for regulating said first power supply;

a second power supply having a second power supply output node and a second sense line node for receiving a second reference voltage for regulating said second power supply;

said first power supply output node electrically coupled to said common bus by a first power diode;

said second power supply output node electrically coupled to said common bus by a second power diode;

a first sense line diode electrically coupling said first sense line node to a first sense line;

a second sense diode electrically coupling said second sense line node to a second sense line; and a sense line adjustment circuit electrically coupling said first sense line and said second sense line to said common bus, said sense line load adjustment circuit being configured to generated a control current to place said first sense line diode and said second sense line diode in a linear region of operation when said variable load is a relatively small load;

whereby measurements of reference voltages used to regulate said first power supply and said second power supply are improved when said variable load is small.

* * * * *